(No Model.)
J. W. CLOUD.
CAR COUPLING.
No. 451,889. Patented May 5, 1891.
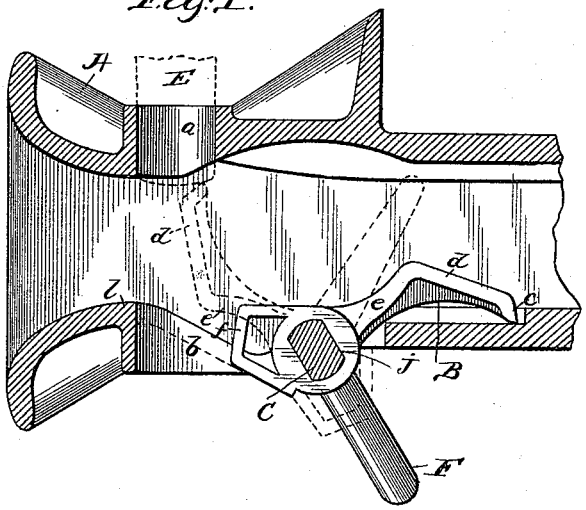
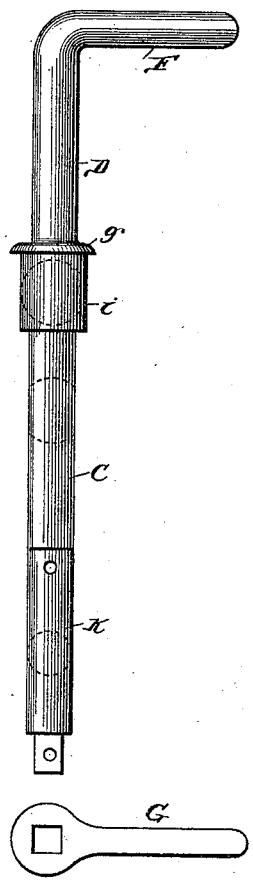
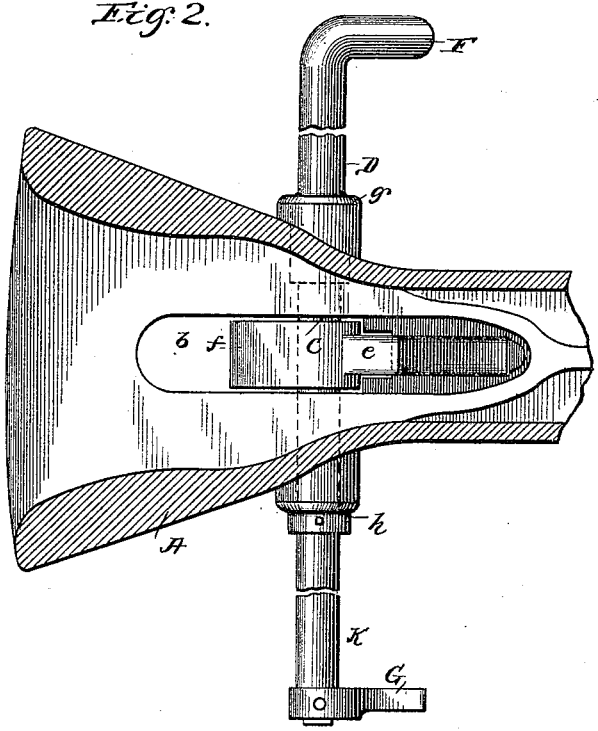
Witnesses.
Wm M. Rheem.
Todd Mason.
Inventor.
John W. Cloud
By Raymond & Veeder
Atty's.

UNITED STATES PATENT OFFICE.

JOHN W. CLOUD, OF CHICAGO, ILLINOIS.

CAR-COUPLING.

SPECIFICATION forming part of Letters Patent No. 451,889, dated May 5, 1891.

Application filed December 2, 1890. Serial No. 373,333. (No model.)

*To all whom it may concern:*

Be it known that I, JOHN W. CLOUD, of Chicago, in the county of Cook and State of Illinois, have invented certain new and useful Improvements in Car-Couplers, of which the following is a specification.

My invention relates to that class of couplers in which a link and pins are used for connecting the cars, and is more particularly concerned with the construction of the draw-head, the link and pins being of the ordinary sort.

The purposes of my invention are to provide for the guidance of the link as the cars approach each other for coupling and to provide for the release of the pin when the link enters the draw-head in such a way that it will not be necessary to go between the cars when making the coupling.

It is the purpose of my invention, also, to so construct the draw-head and its appurtenances that the coupling is sure whether the link is of the standard length or not, and neither the link nor draw-head are liable to damage if the link should be longer than usual.

In the accompanying drawings, Figure 1 is a longitudinal section of my improved draw-head. Fig. 2 is a horizontal section of the same. Fig. 3 shows the shaft on which the dog for operating the link and pin is pivoted.

A is the draw-head, the outer portion of which may be of any approved form. Within the cavity of the draw-head, at the rear of the opening $a\,b$ for the passage of the pin, is pivoted a dog B upon a shaft C in the lower part of the draw-head. It will be seen by a comparison of Figs. 1 and 2 that while the upper part of the pin-opening is, as usual, the shape of the pin-section the lower part $b$ is prolonged, so as to extend beyond the shaft C of the dog B. The cavity at the rear of the pin-aperture is of such dimensions as will allow the dog B to turn back until it rests in the lower part of the draw-head, thus leaving a clear space, into which the link may pass without hinderance. The dog B is shown in its usual position in full lines, while its position when supporting the pin prior to the entrance of the coupling-link is shown in dotted lines in Fig. 1. The dog B has several faces, each shaped to perform a special function. The end face $c$ is perpendicular, or approximately so, to a line drawn from the center of the shaft C to the middle of said face, and supports the pin E when the dog is thrown forward, as shown by dotted lines in Fig. 1. The face $d$ receives the impact of the link as it enters the draw-head, the dog being thus knocked from beneath the pin, so that the latter drops into the link. The concave face $a$, the outer part of which is approximately perpendicular to a radial line from the center of shaft C, is adapted to guide the link when it has been inserted in the draw-head and the pin dropped and it is desired to couple with another draw-head. The manner in which the face $e$ will operate to guide the link will appear from an inspection of Fig. 1. The link will rest on the convex surface of the lower part of the draw-head, and the face $e$ of the dog will extend over the inner end of the link. Turning the dog forward will depress the inner end of the link, correspondingly raising the outer end, while turning the dog back will allow the outer end of the link to drop, the link being held in either case close to the pin, so as to project as far as possible from the draw-head, its entry into the opposite draw-head far enough to insure its coupling being thus secured.

The lug $f$, projecting from the lower part of the dog B, serves two purposes: first, to prevent the dog from falling too far forward when thrown under the pin, and, second, to close the slot $b$ back of the pin and secure the latter from displacement.

The shaft C is shown in Fig. 3, and the manner of its connection to the dog B and fastening to the draw-head A are shown in Figs. 1 and 2.

The cylindrical part $i$, larger in diameter than the rest of the shaft, fits a bearing in one side of the draw-head A. The central portion $j$ is flattened on two sides, presenting an oblong section whose greater dimension equals the diameter of part $i$, and is fitted to a corresponding hole in the dog B, so that shaft and dog are compelled to turn together. The part $k$, which is cylindrical and equal in diameter to the smaller diameter of the part $j$, fits a bearing in the opposite side of the draw-head from the part $i$. The collars $g$ and $h$, the latter being removable, keep the shaft D in place. At the ends of shaft D are formed or secured handles F G for operating the dog B, one of the handles being detachable, so as to permit the insertion or removal of the shaft C in the draw-head.

The position of the dog and handles is so arranged, as shown in Fig. 1, that when the dog is in place under the pin its weight is about balanced; but when it has been pushed back of the pin the preponderance of weight will throw the dog into its normal position, (shown in full lines in Fig. 1,) in which position it leaves the link free play and is not subject to damaging blows itself.

What I claim, and desire to secure by Letters Patent, is—

1. The combination, with the draw-head of a link-and-pin coupler, of a dog rotatable on a shaft journaled in the lower part of the draw-head through the intervention of handles on said shaft, and having the face $c$, adapted to support the pin, the face $d$, adapted to receive the impact of the link, and the face $e$, adapted to operate the link, substantially as described.

2. The combination, with the draw-head of a link-and-pin coupler, said draw-head having a slot in its bottom, the front part of which serves as a pin-hole, of a dog inserted in said slot and rotatable by a shaft journaled in the lower part of said draw-head and provided with handles at the ends, said dog being adapted to support the pin and operate the link, and having a projection $f$, which is adapted to permit the rotation forward of the dog and closes the rear of said slot when the dog is turned back, substantially as described.

3. The combination, with the draw-head of a link-and-pin coupler, the mouth of said draw-head having a convex lower surface, of a dog rotatable by a shaft journaled in the lower part of the draw-head through the intervention of handles on said shaft, said dog being normally turned back to occupy the bottom of the draw-head, leaving a space into which the link may pass over the dog, said dog having a face $e$, adapted to operate the link when turned forward, substantially as described.

4. The combination, with the draw-head of a link-and-pin coupler, of a dog adapted when turned forward to support the pin or operate the link and rotatable by a shaft journaled in the lower part of said draw-head, said shaft being provided with cylindrical bearings $i\ k$ to fit in each side of the draw-head, and the flattened portion $j$ in the middle, on which the dog is fitted, the longer diameter of said flattened portion not exceeding the diameter of the cylindrical bearing $i$ and the shorter diameter of said flattened portion being not less than the smaller cylindrical portion $k$, substantially as described.

JOHN W. CLOUD.

Witnesses:
IRWIN VEEDER,
TODD MASON.